(12) United States Patent
Jam et al.

(10) Patent No.: US 6,824,059 B2
(45) Date of Patent: Nov. 30, 2004

(54) APPARATUS FOR CAPTURING IMAGES AND BARCODES

(75) Inventors: Mehrban Jam, Fremont, CA (US); Geoff Lyon, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 254 days.

(21) Appl. No.: 10/136,831

(22) Filed: Apr. 30, 2002

(65) Prior Publication Data

US 2003/0201328 A1 Oct. 30, 2003

(51) Int. Cl.[7] .................................................. G06K 7/10
(52) U.S. Cl. ........................... 235/462.25; 235/462.01; 235/462.23
(58) Field of Search ........................ 235/462.01, 462.11, 235/462.12, 462.22, 462.23, 462.24, 462.25, 462.41

(56) References Cited

U.S. PATENT DOCUMENTS

| | | | | |
|---|---|---|---|---|
| 5,627,366 A | * | 5/1997 | Katz | 250/234 |
| 5,640,001 A | * | 6/1997 | Danielson et al. | 235/462.23 |
| 6,062,475 A | * | 5/2000 | Feng | 235/462.06 |
| 6,073,851 A | * | 6/2000 | Olmstead et al. | 235/462.45 |
| 6,318,635 B1 | * | 11/2001 | Stoner | 235/462.45 |
| 6,609,660 B1 | * | 8/2003 | Stoner | 235/462.22 |

* cited by examiner

*Primary Examiner*—Thien M. Le
*Assistant Examiner*—April Taylor

(57) ABSTRACT

An apparatus for capturing images and barcodes. The apparatus has an image-sensing device and a lens having a variable-focal-length region and a substantially fixed-focal-length region. The variable-focal-length region focuses light onto a first region of the image-sensing device and the substantially fixed-focal-length region focuses light onto a second region of the image-sensing device. The variable-focal-length region varies such that different portions of that region of the lens focus objects at different distances from the lens in different areas of the first region of the image-sensing device. Thus, the device is able to focus, in the first region of the image-sensing device, objects at varying distances from the apparatus.

23 Claims, 14 Drawing Sheets

200
APPARATUS FOR CAPTURING IMAGES AND BARCODES

TECHNICAL FIELD

The present invention relates to the field of digital imaging. Specifically, the present invention relates to an apparatus for capturing images and barcodes having one or more lenses providing a variable-focal-length region for barcodes and a fixed-focal-length region for images.

BACKGROUND ART

Barcodes have become a ubiquitous way of coding information in a machine-readable form because of the ease with which barcodes may be scanned, processed, stored, etc. via an electronic device. This allows for an accurate and rapid process. However, factors such as cost, power consumption, size, weight, accuracy, ease of use, location of scanner relative to barcode, etc. limit the applications for which conventional barcode scanners are suitable.

One problem with reading barcodes is that the image of the barcode must be sufficiently focused on a sensing component in order to accurately decipher the barcode pattern. The best-known conventional way of reading barcodes is with laser scanners, which have become standard at department and grocery stores. Such devices operate by emitting a beam of laser light, which strikes the surface of the object on which the barcode is imprinted and is then reflected back to the scanning device. Because laser beam is coherent, laser scanners do not face a focusing problem. However, laser scanners are mechanically complex and consequently are relatively expensive and heavy. Also, mechanical devices tend to break down much faster than, for example, a device with no moving mechanical parts.

In order to properly read a barcode, a laser scanner typically has at least one rotating mirror and perhaps several fixed mirrors, upon which a laser beam is reflected before leaving the scanner. The laser scanner may emit multiple such beams as the mirror(s) rotate. In this fashion, the scanner may trace laser beam lines having various angles with respect to one another on the surface containing the barcode. Because the lines will be at various angles with respect to one another, it is likely that at least one line will trace across the entire barcode, thus allowing the barcode to be read. The beams then reflect off the surface containing the barcode and return to the scanner where signal processing interprets the barcode.

Unfortunately, such laser scanners use considerable power. First, considerable power is needed for the laser, and second, considerable power is needed for the motor to rotate the mirror(s). While power consumption may not be a severe issue in a retail store application, power consumption is of great concern if the scanning device is to be used in the field. For example, it is desirable to allow a user without access to an electrical outlet to scan barcodes.

Two further problems with such laser scanners are their size and weight. The motors, mirrors, lasers, etc. just described make the scanner heavy and bulky. However, a relatively lightweight and compact solution is desired for a user in the field.

Another type of barcode reader emits a single incoherent point light source, usually infra-red, and detects its reflection without using rotating mirrors. A single light source is emitted from the barcode reader, reflected off the object with the barcode, and read by a single detector that is generally nearby the light source. While these readers do not require rotating mirrors, the barcode reader must be swiped across the barcode manually to obtain an accurate reading. For example, the barcode reader must be physically touching the object with the barcode or at least be within a few millimeters for the light to reflect back properly for an accurate reading. This leads to error prone measurements, barcode reader wear, and slow operating speed.

It has also been suggested that a digital camera be used to read barcodes. However, instead of using laser light, digital cameras generally use visual or infrared light. As such, focusing the image of the barcode on the sensing array of the camera is very problematic. Consequently, this requires that the barcode always be the same distance from the camera to ensure the barcode is in focus on the sensing array. A conventional solution requires the scanning device to touch the barcode or be a fixed distance away, often no more than a few millimeters.

Conventional digital cameras generally use a charge-coupled device (CCD) array to capture images. Each axis of the array may comprise anywhere from a few hundred to a few thousand pixels. Problematically, those arrays comprising a few thousand pixels per axis are expensive and those comprising only a few hundred pixels per axis do not have sufficient resolution for applications such as reading barcodes. Hence, CCD based barcode readers face a cost versus accuracy tradeoff.

Thus, one problem with conventional barcode scanning devices is they consume too much power, and thus may be unsuitable for a battery operated device. Another problem with conventional devices is that they have too many moving mechanical parts and are thus too unreliable. Another problem with conventional devices is that they are heavy and bulky. Another problem with some conventional devices is that they require the scanner to be placed either very close to or touching the object with the barcode. Additionally, CCD based barcode readers face a cost versus accuracy tradeoff.

DISCLOSURE OF THE INVENTION

The present invention pertains to an apparatus for capturing images and barcodes. The apparatus has an image-sensing device and a lens having a variable-focal-length region and a substantially fixed-focal-length region. The variable-focal-length region focuses light onto a first region of the image-sensing device and the substantially fixed-focal-length region focuses light onto a second region of the image-sensing device. The variable-focal-length region varies such that different portions of that region of the lens focus objects at different distances from the lens in different areas of the first region of the image-sensing device. Thus, the device is able to focus, in the first region of the image-sensing device, objects at varying distances from the apparatus.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7A is a diagram illustrating an apparatus having two separate image-sensing components for capturing images and barcodes, according to an embodiment of the present invention.

BEST MODE FOR CARRYING OUT THE INVENTION

Figure 1:
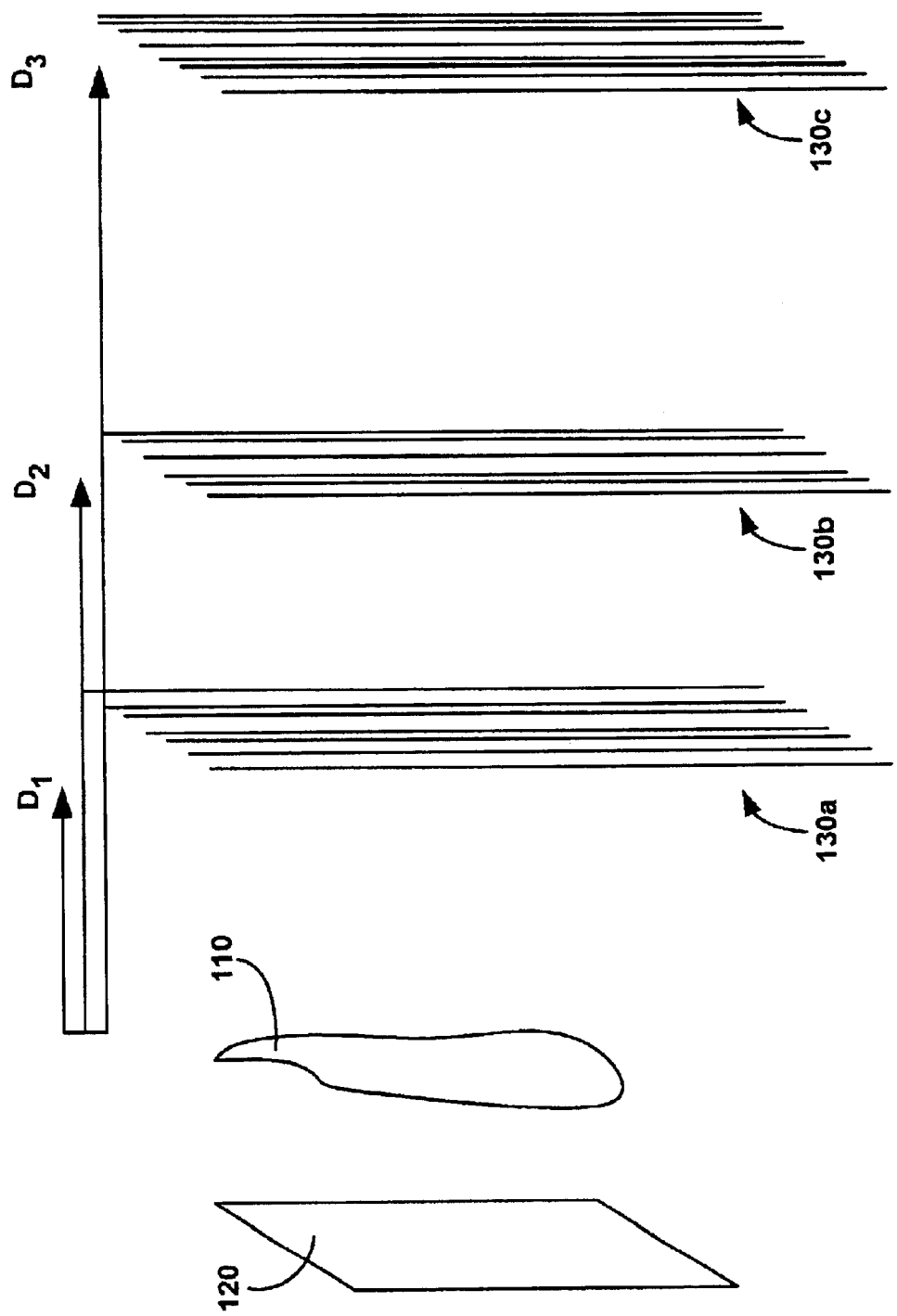
FIG. 1 is a diagram illustrating a variable-focal-length imaging device, according to an embodiment of the present invention.

In the following detailed description of the present invention, numerous specific details are set forth in order to provide a thorough understanding of the present invention. However, the present invention may be practiced without these specific details or by using alternate elements or methods. In other instances well known methods, procedures, components, and circuits have not been described in detail as not to unnecessarily obscure aspects of the present invention.

An apparatus for capturing images and barcodes according to various embodiments of the present invention has an image-sensing device and a lens having a variable-focal-length region and a substantially fixed-focal-length region. The image-sensing device may be a CCD, although this is not limiting. The variable-focal-length region focuses light onto a first region of the image-sensing device. The fixed-focal-length region focuses light onto a second region of the image-sensing device. The variable-focal-length region varies such that different portions of that region of the lens focus, on different areas of the first region of the sensing apparatus, objects at different distances from the lens. Thus, the apparatus is able to focus, in the first region of the image-sensing device, objects at varying distances from the apparatus. Furthermore, the apparatus is able to capture images in the second region of the image-sensing device.

The apparatus may further have a color filter over the second region of the image-sensing device, such that color images may be generated from the image data from that region. However, the first region of the image-sensing device does not have a filter. By using monochrome in that region, higher resolution is achieved for reading barcodes.

In accordance with some embodiments, the apparatus may further comprise a signal processor coupled to the image-sensing device. The signal processor is for decoding barcodes from data from the first region and for processing images from data from the second region.

A barcode reader according to various embodiments of the present invention has an image-sensing device and a variable focal length lens in visual cooperation with the image-sensing device. The image-sensing device may be a charge-coupled device (CCD), a complimentary metal-oxide-semiconductor (CMOS) imaging device, or the like. The variable focal length lens has a focal length that varies across its surface. In this fashion, objects at different distances from the lens are focused onto the sensing device by different portions of the lens. For example, if a barcode is far away from the barcode reader a different portion of the lens will be focusing the barcode on the image-sensing device than if the barcode is close-by. Thus, different regions of the sensing device may focus objects that are at different distances from barcode reader. If the barcode reader is properly oriented, at least a portion of the barcode will be in focus on some region of the image-sensing device.

The barcode reader may further have a software program for processing data from the sensing device to recreate and decode the barcode. For example, the barcode may need to be recreated because only a portion of it is in focus at a given time. The barcode reader may be angled slightly to capture and focus as much of the barcode as is needed to fully decode it. The software program may stitch together various portions of the barcode to recreate the barcode, or at least the minimum amount of the barcode needed to decode it. For example, it is possible to decode the barcode with a single fine stripe oriented perpendicular to the bars. In this fashion, the width of the bars and spaces there-between may be determined.

However, the present invention is not limited to reading barcodes that are made up of 'bars'. For example, some barcodes are linear and may code their information in a series of bars of varying width and with the spaces between the bars varying. Other barcodes are referred to as two-dimensional barcodes. One example of a two-dimensional barcode has a target in the middle (e.g., concentric circles) with a number of objects around the target positioned to code the information. The objects may be, for example, dots, circles, polygons, etc. Another example of a two-dimensional barcode is a series of linear barcodes stacked one on top of the other.

Furthermore, embodiments of the present invention are not limited to reading barcodes. For example, other machine-readable symbols that are used to convey information may also be read. The information may be encoded in some fashion; however, this is not required. For example, embodiments may be used to read symbols such as, for example, alphanumeric characters by performing optical character recognition (OCR). Thus, embodiments are able to read these symbols, as well as others.

Embodiments of the present invention provide for a barcode reader using relatively little power, which may be suitable for a battery operated apparatus. Embodiments have few or no moving mechanical parts, and are thus highly reliable. Embodiments are lightweight and compact. Embodiments may read a barcode whether it is very close or very far from the barcode reader.

FIG. 1 illustrates a side view of an embodiment having a progressive lens 110 and an image-sensing device 120. The progressive lens 110 may have a variable focal point across its surface such that different portions of the progressive lens 110 focus objects 130 at different distances from the progressive lens 110. For example, a portion of the progressive lens 110 near the bottom may focus onto a portion of the image-sensing device 120 the object 130a, which is at distance D1 from the progressive lens 110. It may be that only a portion (e.g., the lower portion) of object 130a is in focus on the image-sensing device 120. Because all information necessary to decode the object 130a may reside in the focused region, the object 130a (e.g., a barcode) is fully decodable even though a portion of it is out of focus.

Still referring to FIG. 1, a portion of the progressive lens 110 near the middle may focus the object 130b, which is at distance D2 from the progressive lens 110. (Or at least a portion of object 130b is focused). The object 130b may be imaged on a different region of the image-sensing device 120 than object 130a. Furthermore, a portion of the progressive lens 110 near the top may focus the object 130c, which is at distance D3 from the progressive lens 110. The progressive lens 110 may have a focal length that varies continuously across its surface, although this is not required. For example, a first region of the progressive lens 110 may have the same focal length as a second distinct region.

Still referring to FIG. 1, it may be that a portion of the object 130 is in focus in one region of the image-sensing device 120 and out of focus in other regions of the image-sensing device 120. By in focus it may be meant that it is focused well enough to be read and decoded with satisfactory accuracy. Thus, the definition of focus may not necessarily be an absolute measure of focus on the image-sensing device 120. Rather, focus may be relative to the particular application and the sophistication of data processing algorithm. For example, an image that is sufficiently focused for one application may not be sufficiently focused for another application. The degree of focus may vary continuously across the image-sensing device 120; however, for purposes of discussion, it may be stated that some regions are in focus and other regions are out of focus.

Figure 2:
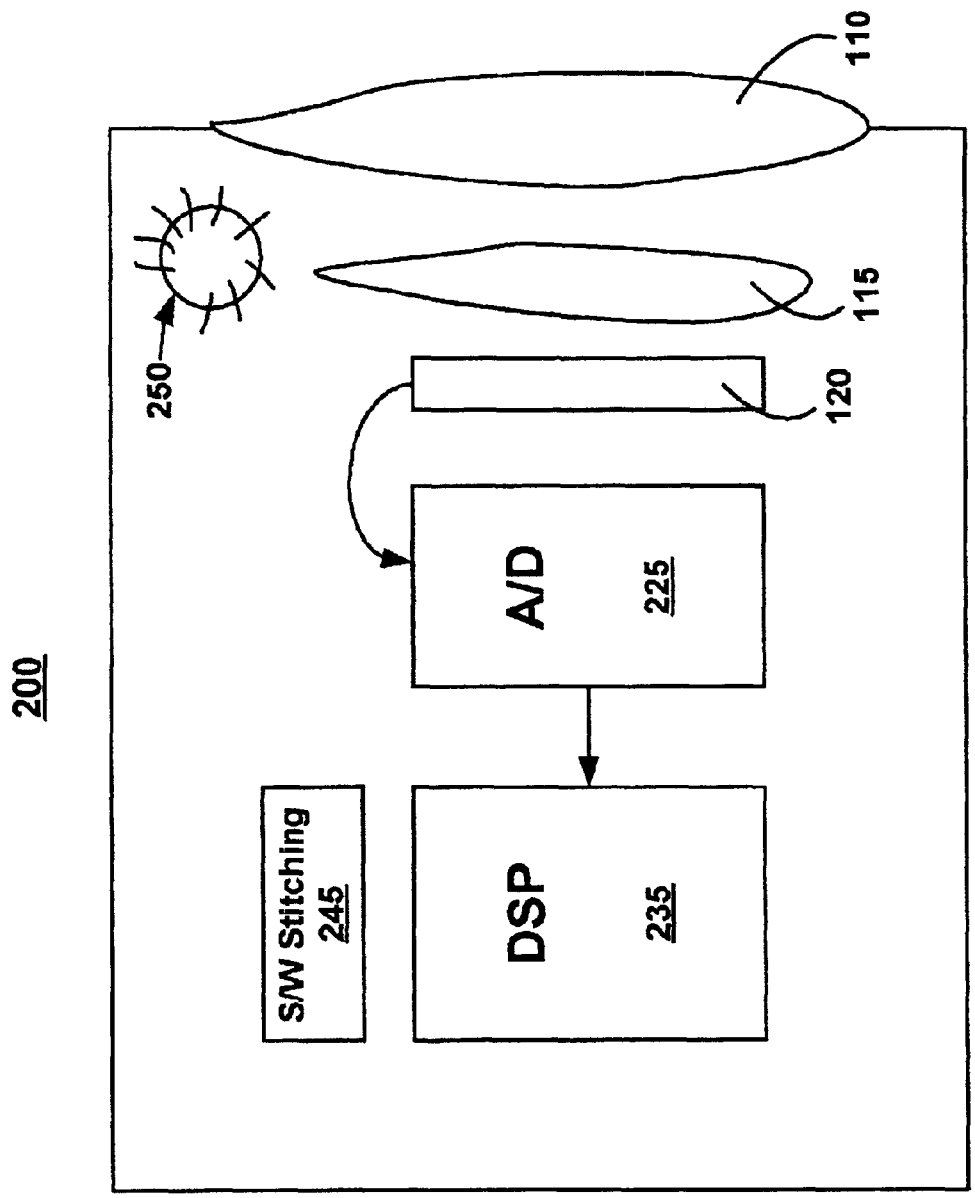
FIG. 2 is a diagram of a portable electronic device having a variable-focal-length lens for reading barcodes, according to an embodiment of the present invention.

FIG. 2 shows another apparatus for reading symbols such as barcodes or the like. The apparatus in FIG. 2 may be a portable electronic apparatus 200, such as, for example, a digital camera, a personal digital assistant (PDA), a mobile phone, etc. In addition to a progressive lens 110 and an image-sensing device 120 (e.g., an image-sensing array), the portable electronic apparatus 200 may have a main lens 115 between the progressive lens 110 and the image-sensing device 120. An analog-to-digital converter 225 (A/D) coupled to the image-sensing device 120 converts the analog image data from the image-sensing device 120 for the digital signal processor 235 (DSP). The portable electronic apparatus 200 may further comprise a software stitching program 245 for interpreting a symbol (e.g., for recreating a barcode from the image data). The DSP 235 or other software may determine whether the barcode is focused sufficiently to properly decode. An edge detection algorithm may be used for this, although this example is not limiting. The portable electronic apparatus 200 may optionally have a light 250 for illuminating the barcode.

Figure 3A:
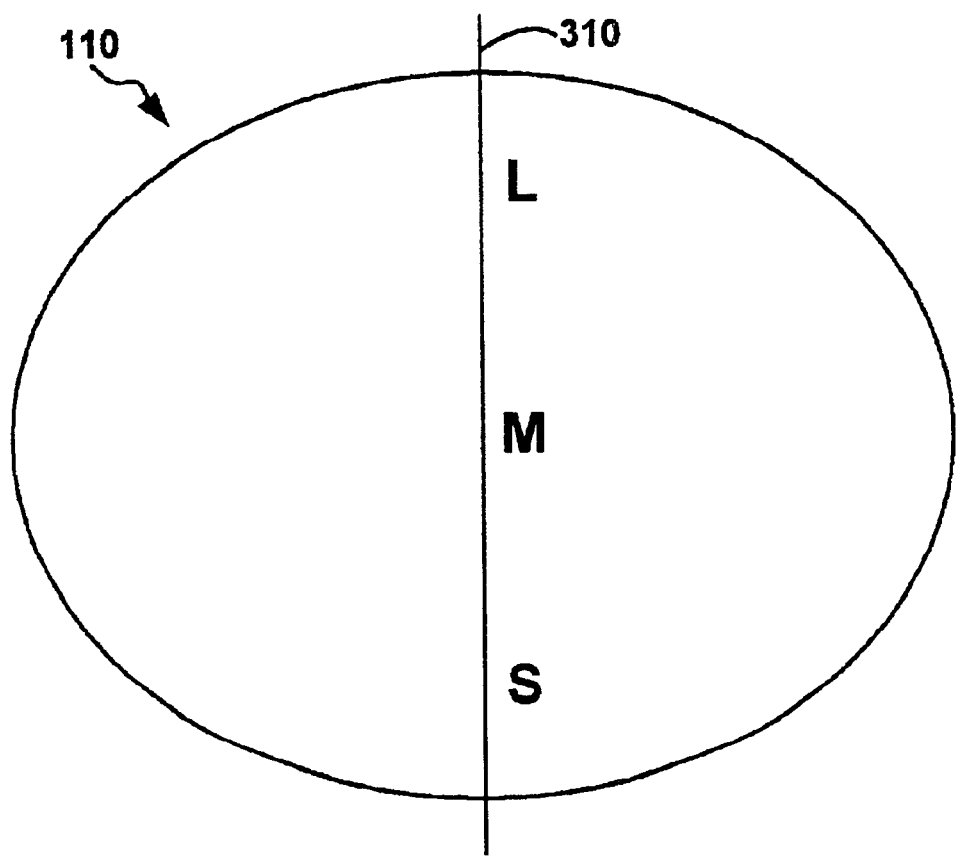
FIG. 3A and FIG. 3B are illustrations of exemplary lenses having a variable-focal-length across their surfaces, according to embodiments of the present invention.

Referring now to FIG. 3A, an exemplary progressive lens 110 is illustrated. It may be that the focal length of the progressive lens 110 varies progressively across an axis 310 of the progressive lens 110. The progressive lens 110 may be shaped to cause objects at varying distances from the progressive lens 110 from approximately a few millimeters to approximately infinity to be in focus on at least one region of the image-sensing device 120, although this is not required. For example, the focal length near the top of the progressive lens 110 may be relatively long (L), near the bottom it may be relatively short (S), and near the middle it may be intermediate (M). Dividing the lens 110 into three areas is done to make discussion convenient; the focal length may vary continuously across the surface. In this fashion, objects may be in focus progressively across an axis of the image-sensing device 120 according to their distance from the progressive lens 110. However, the focal length may vary across the surface of the progressive lens 110 in other fashions. For example, it is not required that the focal length vary from long to short across an axis 310 of the progressive lens 110.

Figure 3B:
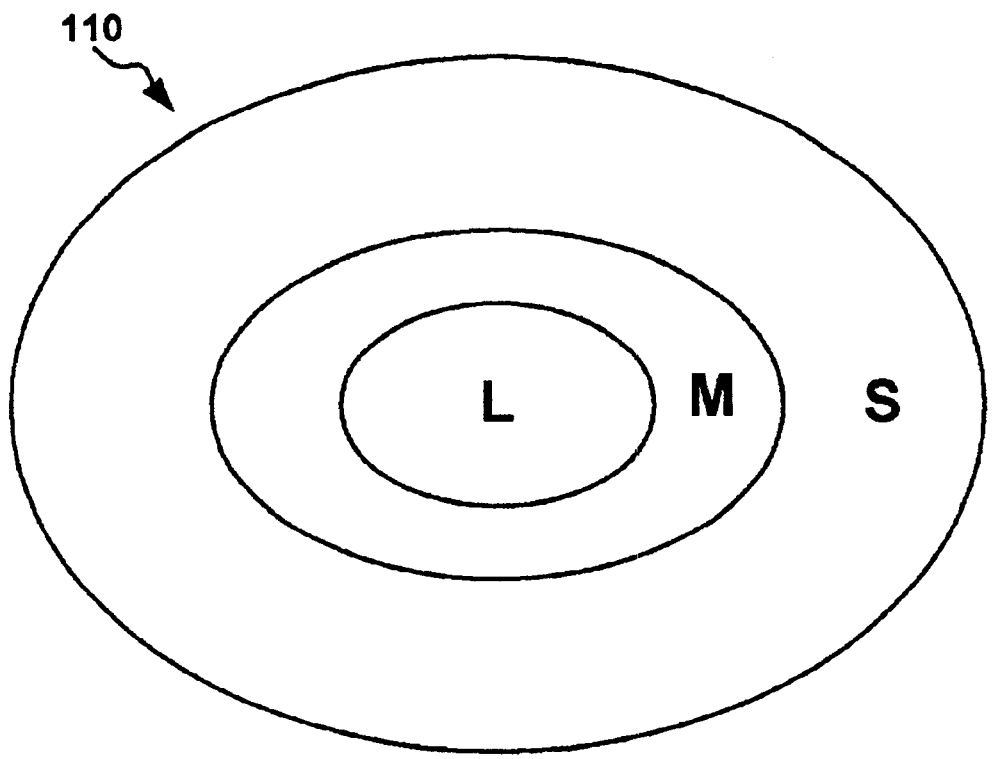

Referring now to FIG. 3B, an alternative embodiment has a progressive lens 110 which has a relatively long focal length (L) in the middle of the lens, a relatively short focal length (S) near the outer edge, and intermediate focal length (M) in between. Thus, the focal length does not vary from long to short across a single axis, but varies across multiple axes. Many other patterns of varying the focal length of the progressive lens 110 progressively across its surface are also possible. The progressive lens 110 may also be of any suitable shape in the plane shown in FIGS. 3A and 3B (e.g., circular, elliptical, rectangular, polygonal, etc.).

Thus, referring to FIGS. 4A–4D, it may be that an image falling on the top of the image-sensing device 120 will be in focus if the object 130 from which the image is formed is at a relatively far distance from the progressive lens 110; an image falling in the middle of the image-sensing device 120 may be in focus if the object is at a medium range of distances; and an image falling on the bottom of the image-sensing device 120 may be in focus if the object is at a close range of distances. Breaking the image-sensing device 120 into three regions is done merely for convenience in discussion. A multitude of such regions could also be described.

Figure 4A:
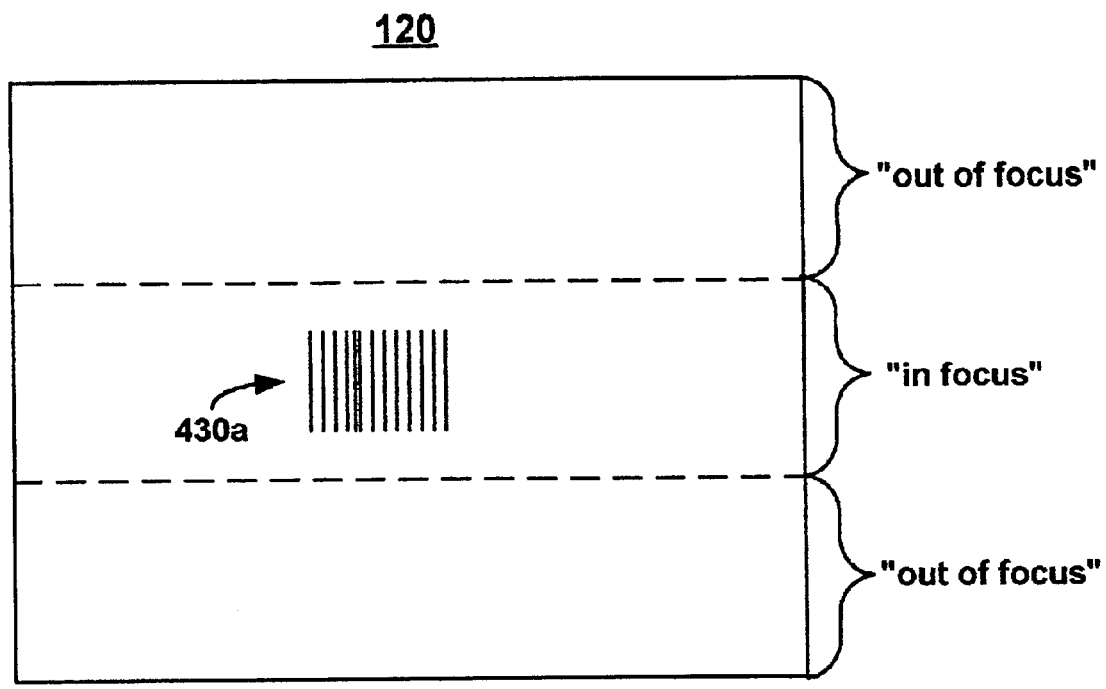
FIGS. 4A–4D are diagrams illustrating image-sensing arrays having an image of a barcode on a region thereof, according to embodiments of the present invention.
Figure 4B:
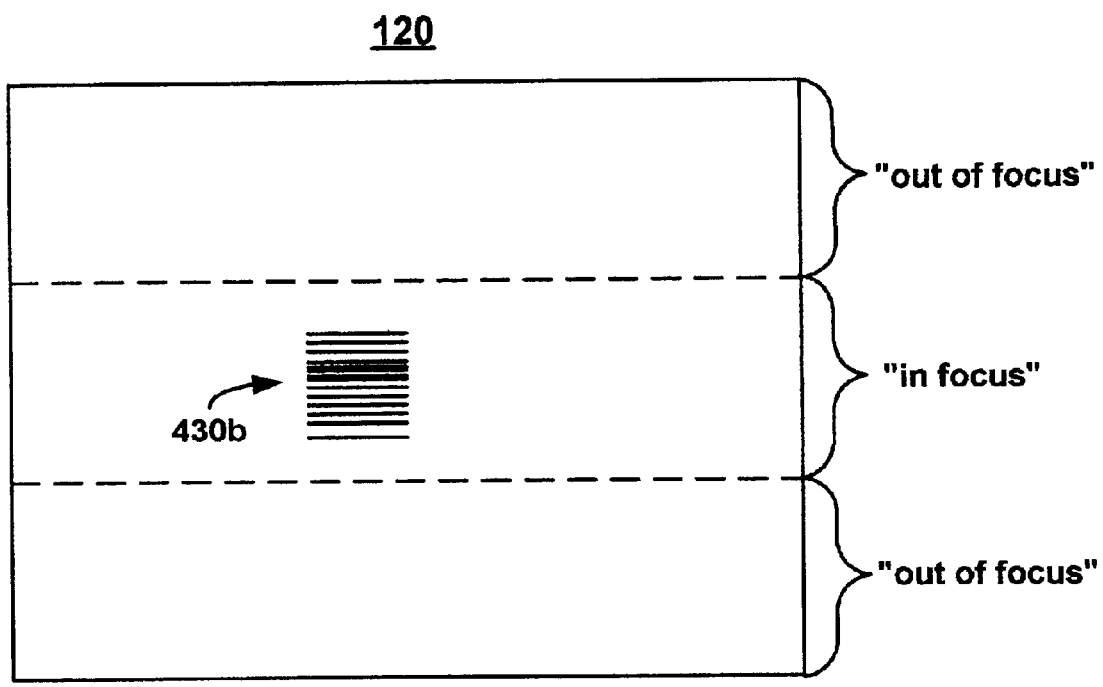
Figure 4C:
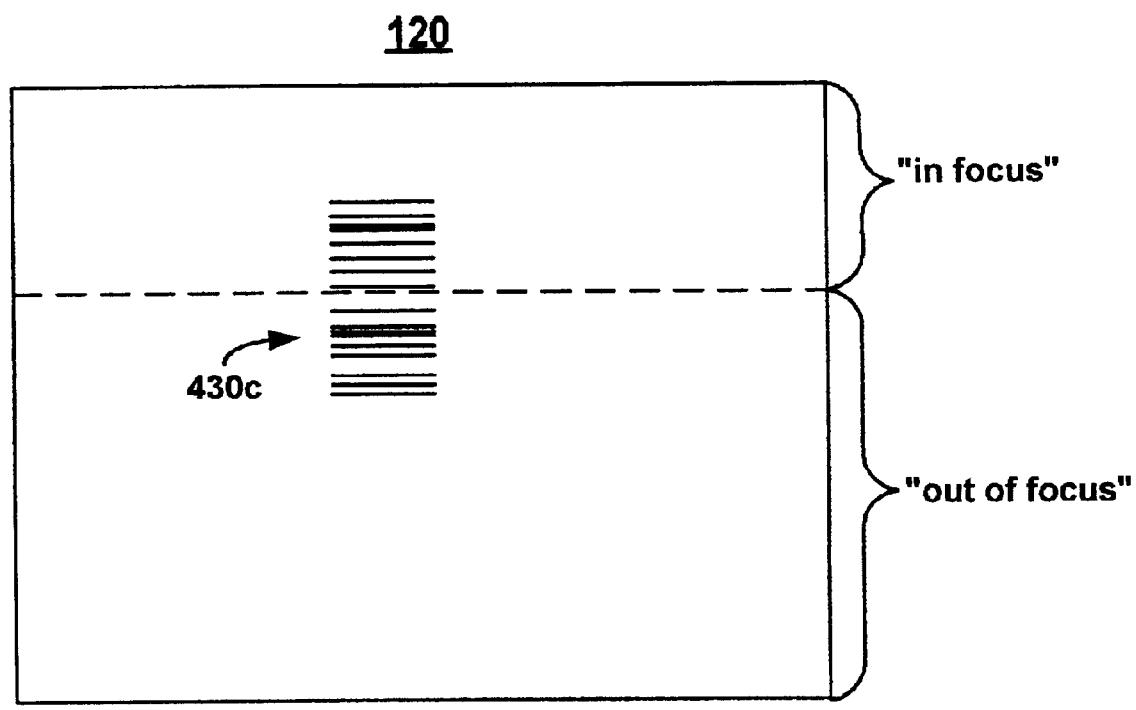

Depending on how the image of the object 130 falls onto the image-sensing device 120, it may be that all, some, or none of the object 130 is in focus. (Again, focused may mean sufficiently focused that data from the image-sensing device 120 may be processed to decode the barcode with suitable accuracy for the application.) Provided the apparatus is oriented to receive a portion of a barcode on a portion of the image-sensing device 120 in which it is sufficiently focused, that portion of the barcode is readable. The apparatus is able to read the barcode with data captured at a single point in time if the portion of the barcode comprises sufficient information to decode the barcode. For example, the apparatus is able to read the barcode with data captured at a single point in time if the portion of the barcode comprises at least a portion of each bar of the barcode, such as illustrated in FIG. 4A, FIG. 4B, and FIG. 4D, for example.

In some cases, regardless of the angle that the barcode is at with respect to an x-y axis of the image-sensing device 110 it may be decoded with data captured at a single point in time. For example, in both FIG. 4A and FIG. 4B the images 430a and 430b may be decoded because sufficient portions of the barcodes fall within the focused region of the image-sensing device 120. The in-focus region could just as well be the upper or lower portion of the image-sensing array 120.

However, in some cases the angle in which the image strikes the image-sensing device 120 may prevent decoding the barcode with data captured at one point in time. For example, in FIG. 4C a barcode 430c, which falls into both in-focus and out of focus regions, may not be fully decoded because some of the bars of the barcode 430c are in an unfocused region. In this case, the apparatus is able to fully decode the barcode by angling the apparatus to capture necessary barcode information on a portion of the image-sensing device in which it is sufficiently focused to be read. For example, a user angles the apparatus slightly such that upper and lower portions of the barcode 430c fall into the focused region. The apparatus may emit a signal such as a beep to alert the user that the barcode has been successfully decoded. The user need not adjust the distance between the apparatus and the barcode to focus the barcode. Furthermore, it is not necessary to alter the distance between the progressive lens 110 and the image-sensing device 120.

Figure 4D:
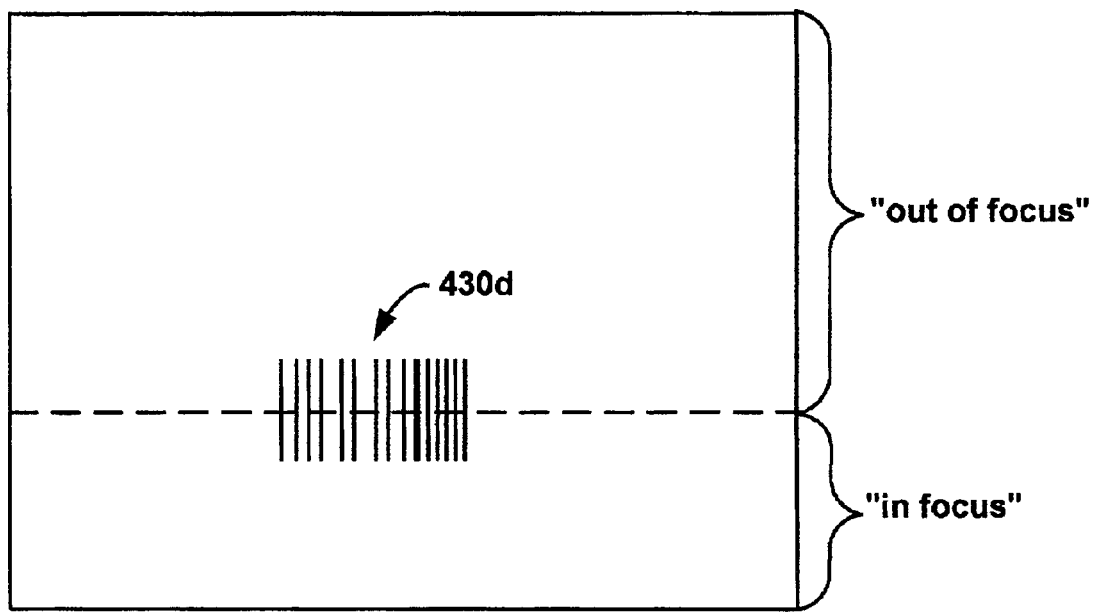

FIG. 4D illustrates a case in which the barcode image 430*d* falls partly into a focused region and partly into an unfocused region. However, in this case it may be fully decoded as a portion of each bar falls in the focused region. For example, the image-sensing device 120 may comprise an array of pixels, wherein the barcode may be decoded by being sufficiently focused to be read from data collected at a line of pixels running across all bars of the barcode image 430*d*. However, an object at the same distance from the apparatus to the barcode (e.g., other portions of the barcode) may be out of focus another substantial group of pixels of the image-sensing device 120. By a substantial group of pixels, it may be meant that more than a few of the remaining pixels. For example, several lines of pixels at the top of barcode image 430*d* may be out of focus.

Figure 5A:
FIG. 5A is a diagram illustrating an apparatus for capturing images and barcodes, according to an embodiment of the present invention.

FIG. 5A illustrates an image-sensing device 500 for capturing images and barcodes. The image-sensing device 500 is divided into two regions. A first region 520 is for receiving barcode data and may be referred to herein as a barcode region 520. A second region 510 is used for receiving image data and may be referring to herein as the image region 510. The two regions may reside on a substrate 525. The image-sensing device 500 may be a charge-coupled apparatus (CCD), a CMOS imaging apparatus, or the like. The apparatus 500 may be used to read a barcode on a package and take a digital photograph of the package at the same time, for example. The digital photograph may be constructed from the data collected in the image region 510 of the image-sensing device 500 and the barcode from the barcode region 520 of the image-sensing device 500.

Figure 5B:
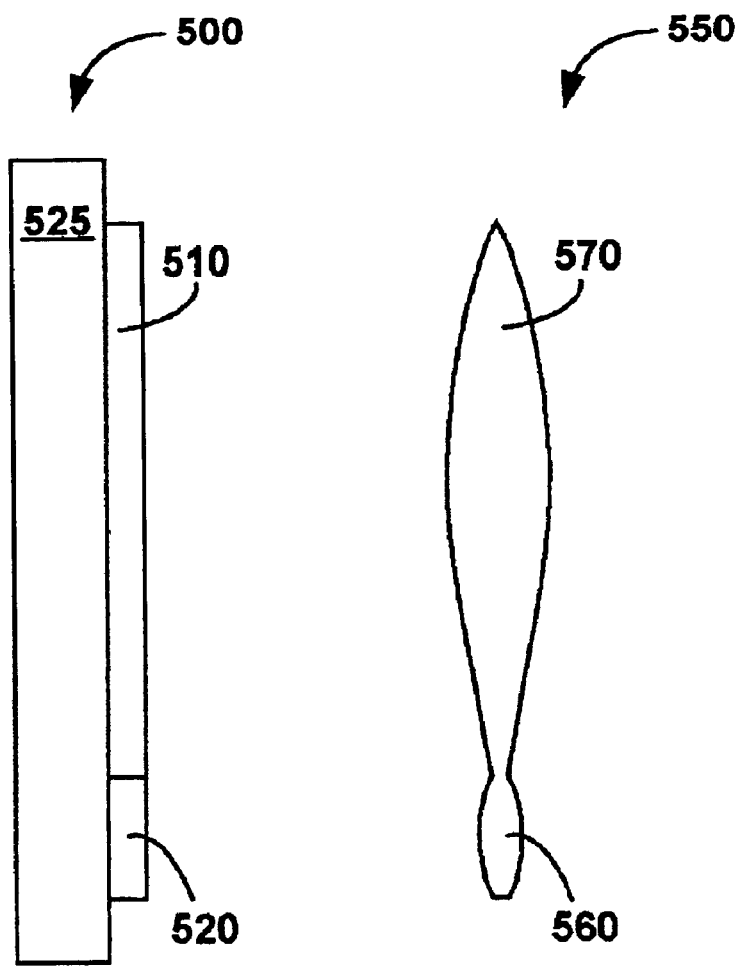
FIG. 5B is a diagram illustrating a side view of an apparatus for capturing images and barcode, according to an embodiment of the present invention.

FIG. 5B illustrates a side view of an apparatus for capturing images and barcodes. The apparatus has an image-sensing device 500 and a lens 550 for focusing images and barcodes Onto appropriate regions of the image-sensing device 500. The lens 550 has a first region or portion 560 of variable-focal-length that may focus light onto the barcode region 520 of the image-sensing device 500. Thus, it may focus a barcode. The lens 550 also has a second region 570 having a substantially fixed-focal-length, which may be used to focus light onto the image region 510 of the image-sensing device 500. Thus, the apparatus may also focus general images.

The variable-focal-length region 560 of the lens 550 illustrated in FIG. 5B may be similar to the progressive lens 110 discussed herein. However, in the embodiment of FIG. 5B, a single lens 550 may have a variable-focal-length region 560 (e.g., a progressive lens 110) and a fixed-focal-length region 570. The focal length may vary across the surface in any suitable fashion. For example, if the lens 550 is projected over the barcode region 520 in FIG. 5A, the focal length of the lens 550 may vary from right to left, from top to bottom, or in any other suitable fashion.

The fixed-focal-length region 570 of the lens 550 may be suitable for imaging objects. By fixed-focal-length it may be meant that the focal length does not change appreciably from one portion of the surface of the fixed-focal-length region 570 of the lens 550 to another. The focal length of this region 570 may be selected according to the particular application(s) for which the apparatus may be used. In one embodiment, the fixed-focal-length region 570 is a long-range fixed-focal-length lens. Thus, the lens 550 may be suitable for capturing and focusing images at ranges beyond a few inches. To use the example of scanning a barcode on a package and capturing the entire package as a digital image, a user may capture the image from up to several feet away. This allows the entire package to fit within the field of view. However, the fixed-focal-length region 570 may also be designed with a relatively wide field to enable objects to be imaged from a closer range while still capturing the entire object.

Figure 6:
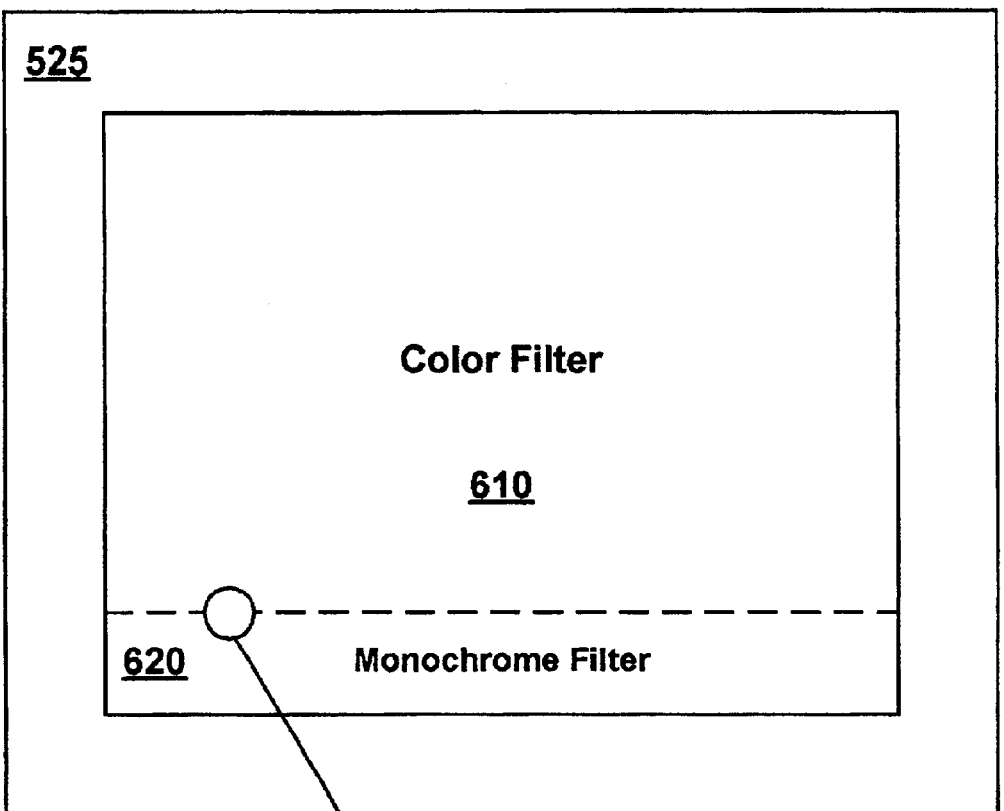
FIG. 6 is a diagram illustrating a filter mask over portions of the image-sensing device, according to an embodiment of the present invention.
Figure 6:
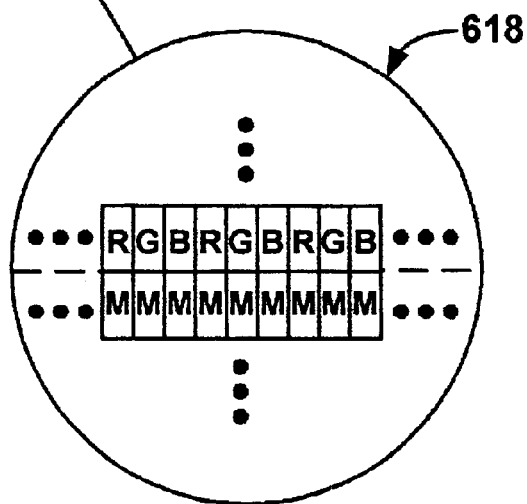

Referring now to FIG. 6, an embodiment provides for a color filter or mask 610 for the image region 510 of the image-sensing device 500. However, the barcode region 520 does not have a filter or may be said to have a monochrome filter 620. The color filter or mask 610 may have plurality of colors formed in a pattern to allow for color imaging in the image region 510. For example, referring to the magnified area 618 of the border of the color filter 610 and the monochrome filter 620, the color filter or mask 610 may have a pattern alternating between red, green, and blue (RGB). The individual color blocks in the color filter 610 may cover one or more pixels. The barcode region 520, having no filter (or a monochrome filter 620), may then have resolution of three times that of the image region 510, assuming the same pixel density is used for each region 510, 520. The present invention is well suited to color filters or masks 610 using other color schemes (e.g., magenta/cyan/yellow, yellow/purple, etc.).

Figure 7A:
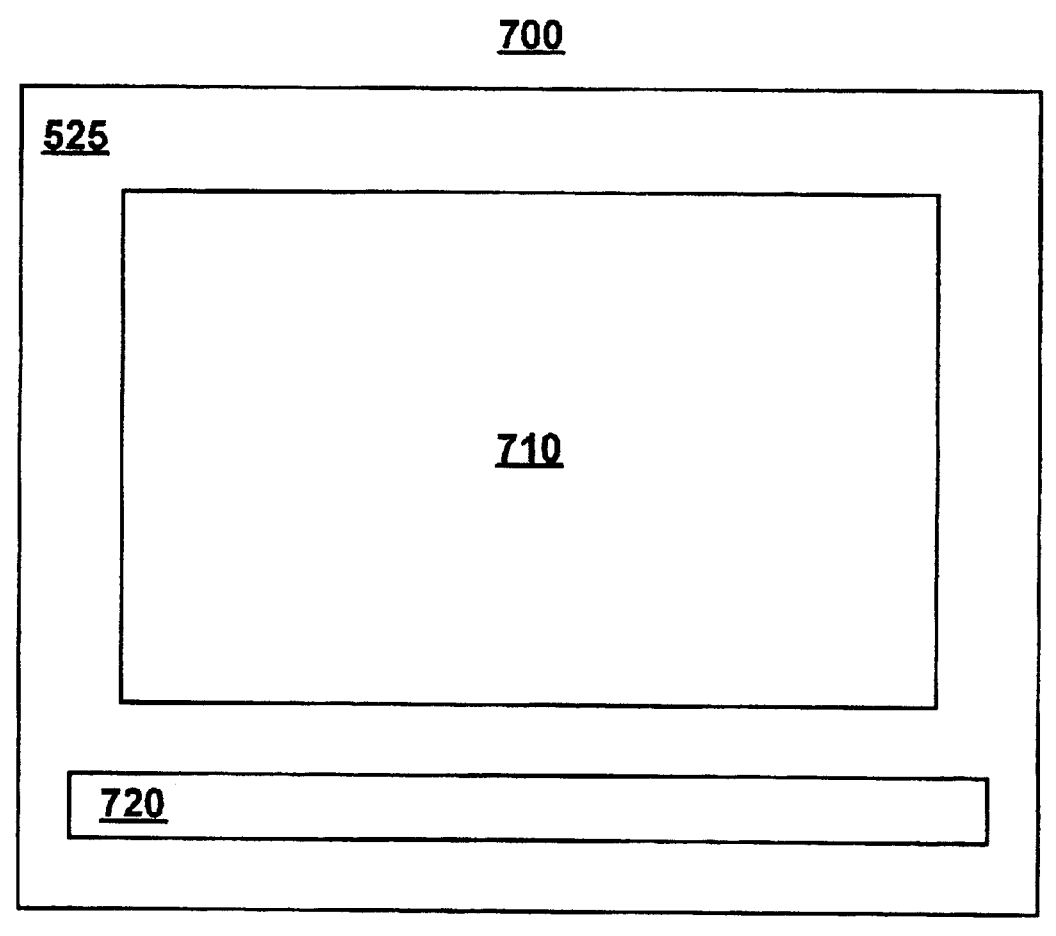

Referring now to FIG. 7A, an embodiment provides for an device 700 for focusing images and barcodes having two separate image-sensing components. This may facilitate constructing each image-sensing component with particular characteristics that are desirable for the type of images captured in that region. Thus, a first image-sensing component 710 may comprise an array of pixels that are optimized for image data. For example, the resolution of the image-sensing components 710 may not need to be nearly as high as the resolution of the barcode-sensing component 720. Thus, the pixel density may be much lower here.

As with other embodiments, a color filter 610 may be applied to the image-sensing component 710. The barcode-sensing component 720 may be a group of pixels that are optimized for barcode data. As stated, the pixel density may be higher here than in the image-sensing component 710, although this is not required. Also, a color filter 610 is not needed to read barcodes, so no filter need be used here, thus allowing for higher resolution. Furthermore, using two distinct image-sensing components 710, 720 makes it easy to construct a barcode sensing component 720 that is a different width than the image-sensing device 710. Thus, a wider sensor may be employed in the barcode-sensing component 720.

Figure 7B:
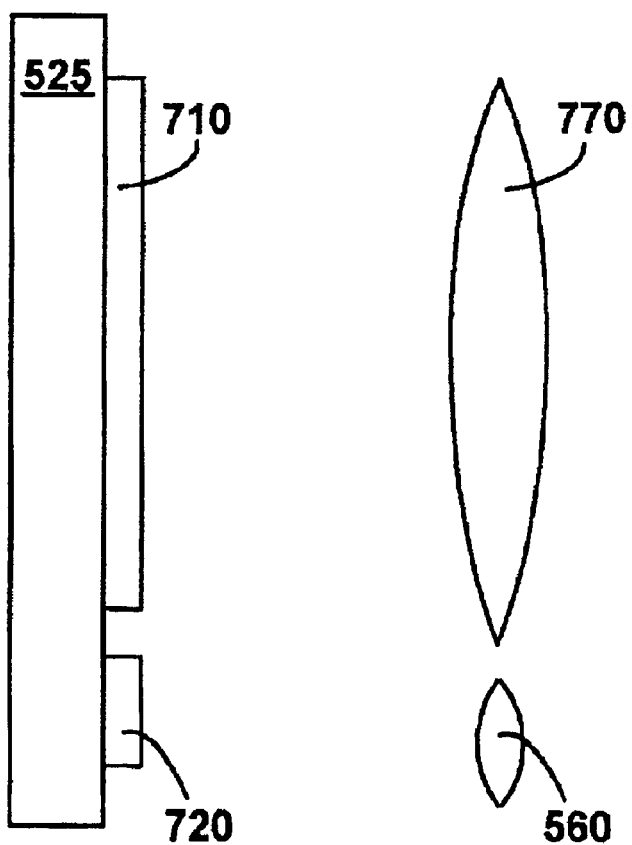
FIG. 7B is a diagram illustrating a side view of an apparatus having two separate image-sensing components for capturing images and barcodes, according to an embodiment of the present invention.

The lens 550 may also be broken into two distinct components, as well. Referring now to FIG. 7B, a first lens 760 having a variable-focal-length focuses light onto the barcode-sensing component 720. A second lens 770 having a substantially fixed-focal-length focuses light onto the image-sensing component 710. Two lenses may also be employed when using an image-sensing device 500 as illustrated in FIG. 5A. Furthermore, it is not required that two lenses be used with the embodiment of FIG. 7A.

Whether using a two component image-sensing device (e.g., as in FIG. 7A) or an integral image-sensing device 500, (e.g., as in FIG. 5A), the entire sensing device may be fabricated on a single integrated circuit.

An embodiment of the present invention provides for a portable electronic apparatus for image and barcode capture.

Figure 8:
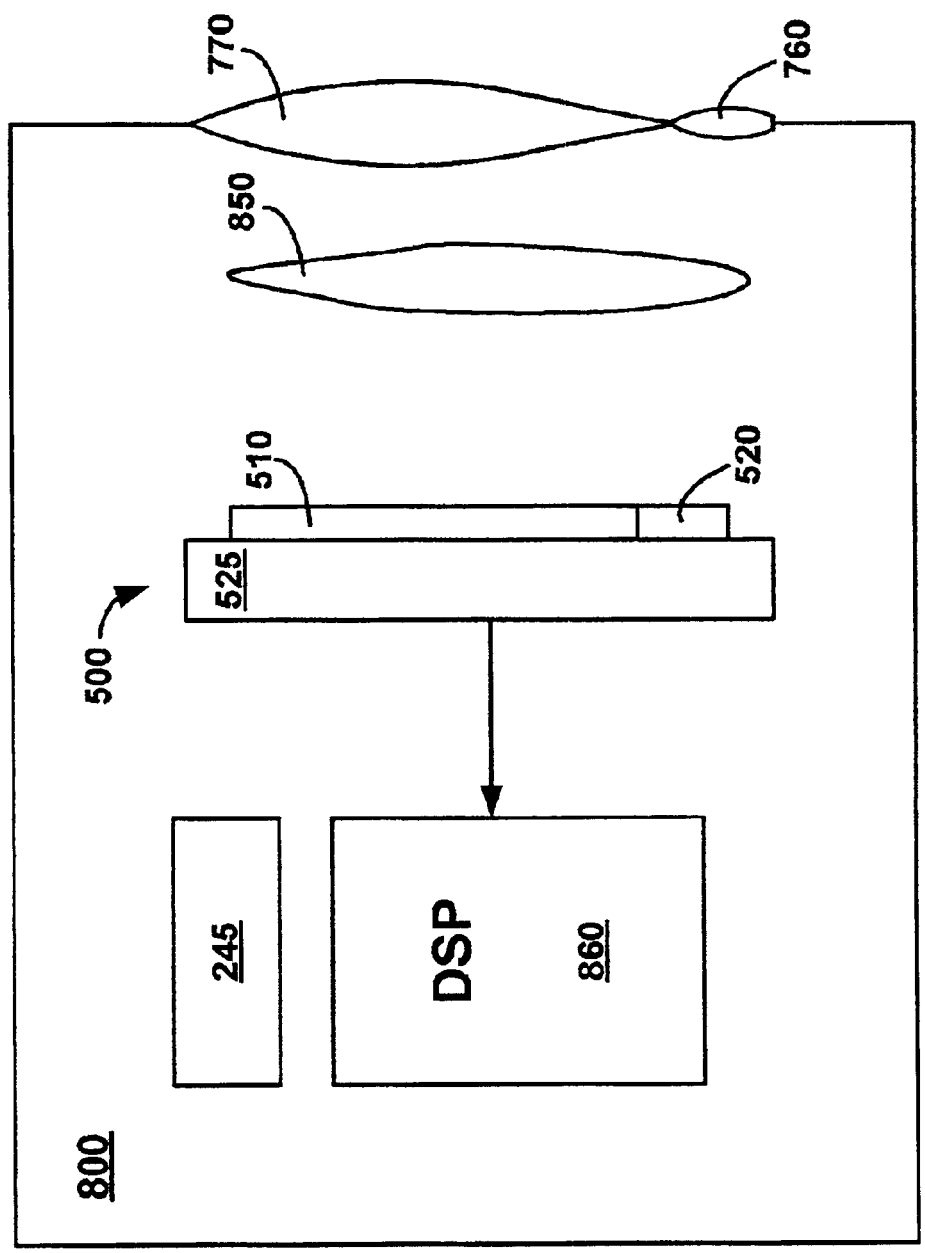
FIG. 8 is a diagram of a portable electronic apparatus for image and barcode capture, according to an embodiment of the present invention.

For example, the portable electronic apparatus may be a personal digital assistant (PDA), a mobile phone, a digital camera, etc. Referring now to FIG. 8, in addition to a fixed-focal-length lens 770, a variable-focal-length lens 760, and an image-sensing device 500 (e.g., an image-sensing array), the portable electronic apparatus 800 may have a main lens 850 between the lenses 760, 770 and the image-sensing device 500. The portable electronic apparatus 800 may have an analog-to-digital converter 225 (A/D) coupled to the image-sensing device 500, although this is not shown. The digital signal processor 860 is coupled to the image-sensing device 500 and is able to decode barcodes from data from the barcode region 520 and process images from data from the image region 510.

The portable electronic apparatus 800 may further comprise a software-stitching program 245 for interpreting a symbol (e.g., for recreating a barcode from the image-sensing device data). The DSP 860 or other software may determine whether the barcode is focused sufficiently to properly decode. For example, an edge detection algorithm may be used, although this example is not limiting. The portable electronic apparatus 800 may optionally have a light (not shown) for illuminating the barcode and other object(s) being imaged.

While the present invention has been described in particular embodiments, it should be appreciated that the present invention should not be construed as limited by such embodiments, but rather construed according to the below claims.

What is claimed is:

1. An apparatus for capturing images and barcodes, comprising:
   an image-sensing device;
   a lens having a variable-focal-length region focusing light onto a first region of said image-sensing device;
   said lens having a substantially fixed-focal-length region focusing light onto a second region of said image-sensing device; and
   wherein focal length in said variable-focal-length region varies such that different portions of said variable-focal-length region focus objects at different distances from said lens in different areas of said first region, wherein said apparatus is able to focus, in said first region, objects at varying distances from said apparatus.

2. The apparatus of claim 1, wherein said substantially fixed-focal-length region is for imaging objects at a long range from said apparatus onto said second region of said image-sensing device.

3. The apparatus of claim 1, further comprising a color filter over at least a portion of said second region of said image-sensing device.

4. The apparatus of claim 1, further comprising a filter mask over said second region of said image-sensing device, wherein said filter mask comprises a plurality of colors formed in a pattern to allow for color imaging in said second region.

5. The apparatus of claim 1, wherein said image-sensing device comprises a first and a second component, said first component comprising said first region and said second component comprising said second region.

6. The apparatus of claim 5, wherein said second component is optimized for image data.

7. The apparatus of claim 5, wherein said first component is optimized for barcode data.

8. An apparatus for focusing images and barcodes, comprising:
   a first image-sensing device;
   a second image-sensing device;
   a first lens having a variable-focal-length and focusing light onto said first image-sensing device;
   a second lens having a substantially fixed-focal-length and focusing light onto said second image-sensing device;
   wherein said first lens has a focal length which varies across said first lens surface such that different portions of said lens focus objects at different distances from said lens at different regions of said first image-sensing device, wherein said apparatus is able to focus barcodes at varying distances from said apparatus; and
   wherein said second lens focuses image data from objects at up to infinity from said apparatus.

9. The apparatus of claim 8, wherein:
   said first image-sensing device comprises an array of pixels; and
   said apparatus further comprises a filter mask over at least a portion of said first image-sensing device.

10. The apparatus of claim 9, wherein said filter mask comprises a pattern alternating between at least two colors.

11. The apparatus of claim 8, wherein pixel density of said second image-sensing device is higher than pixel density of said first image-sensing device.

12. The apparatus of claim 8, wherein said apparatus is operable to focus barcodes at a range from said apparatus of a few millimeters to approximately infinity on at least one region of said first image-sensing device without moving said first lens relative to said first image-sensing device.

13. The apparatus of claim 8, wherein said apparatus is able to focus an image of a barcode on said first image-sensing device without altering the distance between said apparatus and said barcode by said apparatus being angled to cause said barcode image to be formed from light passing through a portion of said first image-sensing device with appropriate focal length given the distance said barcode is from said apparatus.

14. A portable electronic apparatus for image and barcode capture, comprising:
   an image-sensing device having a first and a second region;
   a lens having a first portion of variable-focal-length focusing light onto said first region and said lens having a second portion with a substantially fixed-focal-length focusing light onto said second region;
   a signal processor coupled to said image-sensing device, said processor for decoding barcodes from data from said first region and for processing images from data from said second region; and
   wherein said focal length of said first portion of said lens varies such that different areas of said first portion focus objects at different distances from said lens at different areas of said first region of said image-sensing device, wherein said apparatus is able to focus, in said first region, objects at varying distances from said apparatus.

15. The portable electronic apparatus of claim 14, wherein said image-sensing device is fabricated on a single integrated circuit.

16. The portable electronic apparatus of claim 14, wherein said portable electronic apparatus is a personal digital assistant.

17. The portable electronic apparatus of claim 14, wherein said portable electronic apparatus is a mobile telephone.

18. The portable electronic apparatus of claim 14, wherein said image-sensing device comprises an array of pixels; and said portable electronic apparatus further comprises a color filter over at least a portion of said second region of said image-sensing device and not over said first region.

19. The portable electronic apparatus of claim 18, wherein said color filter comprises a pattern alternating between at least two colors.

20. The portable electronic apparatus of claim 14, wherein pixel density of said second region of said image-sensing device is higher than pixel density of said first region.

21. The portable electronic apparatus of claim 14, wherein said first region is substantially smaller than said second region.

22. The portable electronic apparatus of claim 14, wherein said first region comprises substantially fewer pixels than said second region.

23. The portable electronic apparatus of claim 14, wherein pixel density of said first region of said image-sensing device is substantially higher than pixel density of said second region.

* * * * *